(12) United States Patent
Hernacki et al.

(10) Patent No.: US 8,108,536 B1
(45) Date of Patent: Jan. 31, 2012

(54) SYSTEMS AND METHODS FOR DETERMINING THE TRUSTWORTHINESS OF A SERVER IN A STREAMING ENVIRONMENT

(75) Inventors: Brian Hernacki, San Carlos, CA (US); Timothy G. Brown, Fort Edward, NY (US); Rob Clyde, Pleasant Grove, UT (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 348 days.

(21) Appl. No.: 12/165,629

(22) Filed: Jun. 30, 2008

(51) Int. Cl.
*G06F 15/16* (2006.01)

(52) U.S. Cl. ........ 709/231; 709/201; 709/202; 709/203; 709/224

(58) Field of Classification Search .................. 709/231, 709/201, 203, 224, 202
See application file for complete search history.

(56) References Cited

U.S. PATENT DOCUMENTS

| | | | |
|---|---|---|---|
| 6,189,035 B1 * | 2/2001 | Lockhart et al. | 709/229 |
| 6,532,459 B1 * | 3/2003 | Berson | 1/1 |
| 7,284,124 B1 * | 10/2007 | Ginsberg | 713/167 |
| 2002/0042830 A1 * | 4/2002 | Bose et al. | 709/230 |
| 2005/0235351 A1 * | 10/2005 | Seltzer et al. | 726/14 |
| 2007/0067581 A1 * | 3/2007 | Baek | 711/153 |
| 2007/0143629 A1 * | 6/2007 | Hardjono et al. | 713/189 |
| 2008/0301802 A1 * | 12/2008 | Bates et al. | 726/16 |
| 2009/0240936 A1 * | 9/2009 | Lambiase et al. | 713/156 |
| 2009/0319562 A1 * | 12/2009 | Holm-Petersen et al. | 707/103 R |
| 2010/0218236 A1 * | 8/2010 | Hardjono et al. | 726/3 |

* cited by examiner

*Primary Examiner* — Lan-Dai Truong
(74) *Attorney, Agent, or Firm* — Advantedge Law Group

(57) ABSTRACT

A computer-implemented method for determining the trustworthiness of a server may comprise: 1) identifying a streaming application that originates from a server, 2) determining a trust level for the server, and then 3) determining, based on the trust level, whether to stream the streaming application from the server. The trust level for the server may be determined by comparing current streams (or portions of current streams) received from the server with prior streams to detect change, by communicating with peer computing systems or reputation services, and/or by analyzing locally stored information. Corresponding systems and computer-readable media are also disclosed.

19 Claims, 11 Drawing Sheets

FIG. 6

Local History File 600

| Server Name | IP Address | Previous Downloads | Trust Level | Checksums | Server Trust Level |
|---|---|---|---|---|---|
| Rigel | 124.3.9.1 | mp3max | 5.5 | 13578903 | 8.6 |
| | | process | 10 | 19470376 | |
| | | mp3max2 | 9 | 59207980 | |
| | | mp3max3 | 7 | 43298234 | |
| SafetyBank | 178.3.9.3 | ubank | 10 | 42992879 | 9.8 |
| | | ubankv2 | 10 | 97236023 | |
| | | ubankv3 | 10 | 42297989 | |
| | | banker | 9 | 50090987 | |
| | | budget | 10 | 40784238 | |
| | | taxfriend | 9.5 | 22374000 | |
| | | budgetv2 | 9.3 | 39777668 | |
| TheDestroyer | 6.1.07.1 | ispy | 1 | 74792310 | 0.2 |
| | | yourinfo | .5 | 98774974 | |
| | | malmaker | 0 | 99944887 | |
| | | phishphan | .2 | 09890421 | |
| | | getyourssn | .7 | 64108749 | |
| | | malmaker2 | .6 | 34189705 | |
| Rawl | 4.15.04.4 | autooven | 2.5 | 56785324 | 6 |
| | | autostove | 6.6 | 14143627 | |
| | | autosink | 4.9 | 23457776 | |
| | | mp3max2 | 9 | 59207980 | |
| | | mp3max3 | 7 | 43298234 | |

Server-Trust Report 700

| Server Name | IP Address | Previous Downloads | Trust Level | Checksums | Server Trust Level |
|---|---|---|---|---|---|
| Rigel | 124.3.9.1 | mp3max | 5.5 | 13578903 | 8.6 |
| | | process | 10 | 19470376 | |
| | | mp3max2 | 9 | 59207980 | |
| | | mp3max3 | 7 | 43298234 | |
| SafetyBank | 178.3.9.3 | ubank | 10 | 42992879 | 9.8 |
| | | ubankv2 | 10 | 97236023 | |
| | | ubankv3 | 10 | 42297989 | |
| | | banker | 9 | 50090987 | |
| | | budget | 10 | 40784238 | |
| | | taxfriend | 9.5 | 22374000 | |
| | | budgetv2 | 9.3 | 39777668 | |
| TheDestroyer | 6.1.07.1 | ispy | 1 | 74792310 | 0.2 |
| | | yourinfo | .5 | 98774974 | |
| | | malmaker | 0 | 99944887 | |
| | | phishphan | .2 | 09890421 | |
| | | getyourssn | .7 | 64108749 | |
| | | malmaker2 | .6 | 34189705 | |
| Rawl | 4.15.04.4 | autooven | 2.5 | 56785324 | 6 |
| | | autostove | 6.6 | 14143627 | |
| | | autosink | 4.9 | 23457776 | |
| | | mp3max2 | 9 | 59207980 | |
| | | mp3max3 | 7 | 43298234 | |

*FIG. 7*

| Partial Checksum Verification Table 800 |||
|---|---|---|
| Segment Description 802 | Expected Checksum 804 | Calculated Checksum 806 |
| Bytes 0-FFFF | 61471177 | 61471177 |
| Bytes 10000-1FFFF | 64285609 | 64285609 |
| Bytes 20000-2FFFF | 61599908 | 61599908 |
| Bytes 30000-3FFFF | 94754148 | 94754148 |
| Bytes 40000-4FFFF | 22852930 | 22852930 |
| Bytes 50000-5FFFF | 47540799 | 47540799 |
| Bytes 60000-6FFFF | 65968615 | 65968615 |
| Bytes 70000-7FFFF | 89466470 | 89466470 |
| Bytes 80000-8FFFF | 22647172 | 22647172 |
| Bytes 90000-9FFFF | 04995758 | 04995758 |
| Bytes 100000-10FFFF | 16529851 | 16529851 |
| Bytes 110000-12FFFF | 51931310 | 51931310 |
| Bytes 120000-12FFFF | 09953583 | 09953583 |
| Bytes 130000-13FFFF | 70040246 | 70040246 |
| Bytes 140000-14FFFF | 65079714 | 65079714 |
| Bytes 150000-15FFFF | 89927138 | 89927138 |
| Bytes 160000-16FFFF | 51010389 | 51010389 |
| Bytes 170000-17FFFF | 75857813 | 75857813 |
| Bytes 180000-18FFFF | 07669895 | 07669895 |
| Bytes 190000-19FFFF | 52350686 | 52350686 |
| Bytes 200000-20FFFF | 14041469 | 52626564 |
| Bytes 210000-21FFFF | 39814997 | 81917093 |
| Bytes 220000-22FFFF | 05608289 | 59621639 |
| Bytes 230000-23FFFF | 46031323 | 99263096 |
| Bytes 240000-24FFFF | 52767202 | 53738017 |
| Bytes 250000-25FFFF | 55333905 | 20694752 |
| Bytes 260000-26FFFF | 32576610 | 51086320 |
| Bytes 270000-27FFFF | 79931844 | 25187972 |
| Bytes 280000-28FFFF | 89207022 | 37581687 |
| Bytes 290000-29FFFF | 97702617 | 78273246 |
| Bytes 300000-30FFFF | 62440983 | 97074600 |
| Bytes 310000-31FFFF | 97068525 | 38447218 |
| Bytes 320000-32FFFF | 96990722 | 62752233 |
| Bytes 330000-33FFFF | 24881422 | 58970579 |
| Bytes 340000-34FFFF | 97287712 | 70446389 |
| Bytes 350000-35FFFF | 03554330 | 01415081 |
| Bytes 360000-36FFFF | 63640993 | 43645636 |
| Bytes 370000-37FFFF | 58387878 | 29056297 |
| Bytes 380000-38FFFF | 66787592 | 60646911 |
| Bytes 390000-39FFFF | 57844647 | 26922377 |

*FIG. 8*

SYSTEMS AND METHODS FOR DETERMINING THE TRUSTWORTHINESS OF A SERVER IN A STREAMING ENVIRONMENT

BACKGROUND

Application streaming benefits many computer users. For example, application streaming may allow users to execute a program over a network without downloading and installing the application. Unfortunately, many users of application streaming assume a relationship of trust between a client computing device and the server streaming the application. In heavily-managed computer networks, such a relationship of trust may exist. However, in other less-managed networks, the network may not have an established level of trust.

For example, a client (such as a consumer's computer) may possess little or no information about a server. In addition, the client may be unable to rely on traditional means to establish a level of trust with the server since server keys and server certifications may be unreliable. Even if the client establishes a level of trust with a particular server, the security of the server may later be compromised. Such a compromise may cause a client computing device to assume a level of trust that previously existed but is no longer applicable.

As such, the instant disclosure identifies a need for mechanisms for assessing and continually monitoring the trustworthiness of a server in a streaming environment.

SUMMARY

As will be described in greater detail below, the instant disclosure generally relates to systems and methods for determining the trustworthiness of a server in a streaming environment. As detailed below, in certain embodiments, a computing system may be able to determine and continually monitor the trustworthiness of a server by comparing current streams (or portions of current streams) received from the server with prior streams to detect change, by communicating with peer computing systems or reputation services, and/or by analyzing locally stored information.

For example, a computer-implemented method for determining the trustworthiness of a server in a streaming environment may comprise: 1) identifying a streaming application that originates from a server, 2) determining a trust level for the server, and 3) determining, based on the trust level, whether to stream the streaming application from the server.

In one example, the method may also comprise determining, by analyzing a local history file, whether the streaming application has previously been streamed from the server. If the streaming application has previously been streamed from the server, then the system may: 1) stream a portion of the streaming application from the server, 2) calculate a checksum for the portion, and 3) determine whether the checksum for the portion is identical to an expected checksum for the portion. If the checksums are identical, the system may continue streaming and analyzing the application.

If the client has not previously streamed the application from the server, then the client may obtain information that may be used to determine a trust level for the server (such as trust information for the application offered by the server) from a reputation service and/or a peer computing device. Upon receiving this information, the system may prompt, via a user interface, a user to determine whether to stream the application from the server.

The method may further comprise streaming the entire streaming application from the server and/or calculating a checksum for the streaming application. The method may also comprise storing the checksum in a local history file, transmitting the checksum to a peer computing device, and/or transmitting the checksum to a reputation service. In certain embodiments, the checksum may comprise a partial checksum for a portion of the streaming application and/or a full checksum for the streaming application.

Corresponding systems and computer-readable media are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram illustrating the contents of a local history file according to at least one embodiment.

FIG. 7 is a block diagram illustrating the contents of a server-trust report according to at least one embodiment.

FIG. 8 is a block diagram illustrating the contents of a partial checksum verification table according to at least one embodiment.

Figure 1:
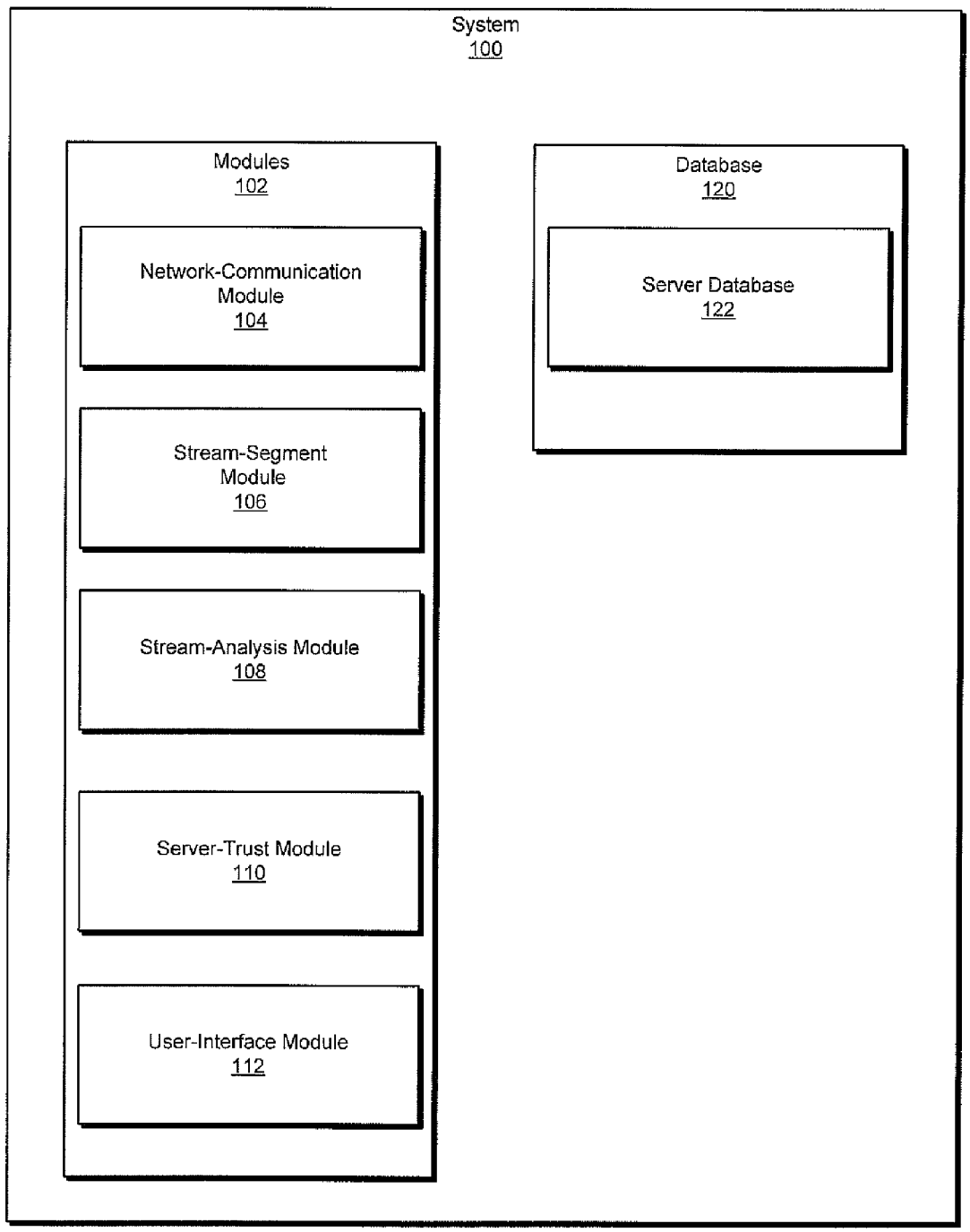
FIG. 1 is a block diagram of an exemplary system for determining the trustworthiness of a server according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for determining the trustworthiness of a server in a streaming environment. As detailed below, in certain embodiments, a computing system may be able to determine the trustworthiness of a server by comparing current streams (or portions of current streams) received from the server with prior streams to detect change, by communicating with peer computing systems and reputation services, and/or by analyzing locally stored information.

The following will provide, with reference to FIGS. 1, 2, 4, and 5, detailed descriptions of exemplary systems for determining the trustworthiness of a server in a streaming environment. A description of locally stored information that a computing device may use to evaluate the trustworthiness of a server will be provided in connection with FIGS. 6 and 8. In addition, a description of information received from other computing devices or a reputation service that a computing device may use to evaluate the trustworthiness of a server will be provided in connection with FIG. 7. A description of an exemplary user interface for prompting a user to evaluate the trustworthiness of a server will also be provided in connection with FIG. 9. Finally, a detailed description of a corresponding exemplary computer-implemented method will be provided in connection with FIG. 3.

FIG. 1 is a block diagram of an exemplary system 100 for determining the trustworthiness of a server in a streaming environment. As illustrated in this figure, exemplary system 100 may comprise one or more modules 102 for performing one or more tasks. For example, exemplary system 100 may comprise a network-communication module 104 for facilitating communication with peer computing systems and reputation services. Exemplary system 100 may also comprise a stream-segment module 106 for segmenting a data stream received from a server into analyzable parts.

In certain embodiments, exemplary system 100 in FIG. 1 may also comprise a stream-analysis module 108 for analyzing information contained in a data stream received from a server. System 100 may also comprise a server-trust module 110 for determining the trustworthiness of a server in a streaming environment. Finally, exemplary system 100 may comprise a user-interface module 112 for providing a user interface for prompting a user to provide input on the trustworthiness of a server.

As illustrated in FIG. 1, exemplary system 100 may also comprise one or more databases 120. For example, exemplary system 100 may comprise a server database 122 for storing information that may aid a computing system in determining the trustworthiness of a server in a streaming environment. Databases 120 may represent portions of a single database or a single computing device.

In certain embodiments, one or more of modules 102 in FIG. 1 may represent one or more software applications or programs that, when executed by a computing device, may cause the computing device to perform one or more tasks required to determine the trustworthiness of a server in a streaming environment. For example, as will be described in greater detail below, one or more of modules 102 may represent software modules configured to run on one or more computing devices, such as the devices in FIG. 2 (e.g., client 202 and server 206), the devices in FIG. 4 (e.g., computing devices 402, 404, and 406 and server 410), the devices in FIG. 5 (e.g., client 502, server 506, and reputation service 508), computing system 1010 in FIG. 10, and/or portions of exemplary network architecture 1100 in FIG. 11. One or more modules 102 in FIG. 1 may also represent all or portions of one or more special-purpose computers configured to perform one or more tasks required to determine the trustworthiness of a server in a streaming environment.

In addition, one or more of databases 120 in FIG. 1 may represent a portion of one or more computing devices. For example, one or more of databases 120 may represent a portion of one or more of the devices in FIG. 2, the devices in FIG. 4, the devices in FIG. 5, computing system 1010 in FIG. 10, and/or portions of exemplary network architecture 1100 in FIG. 11. Alternatively, one or more of databases 120 in FIG. 1 may represent one or more physically separate devices capable of being accessed by a computing device, such as the devices in FIG. 2, the devices in FIG. 4, the devices in FIG. 5, computing system 1010 in FIG. 10, and/or portions of exemplary network architecture 1100 in FIG. 11.

Figure 2:
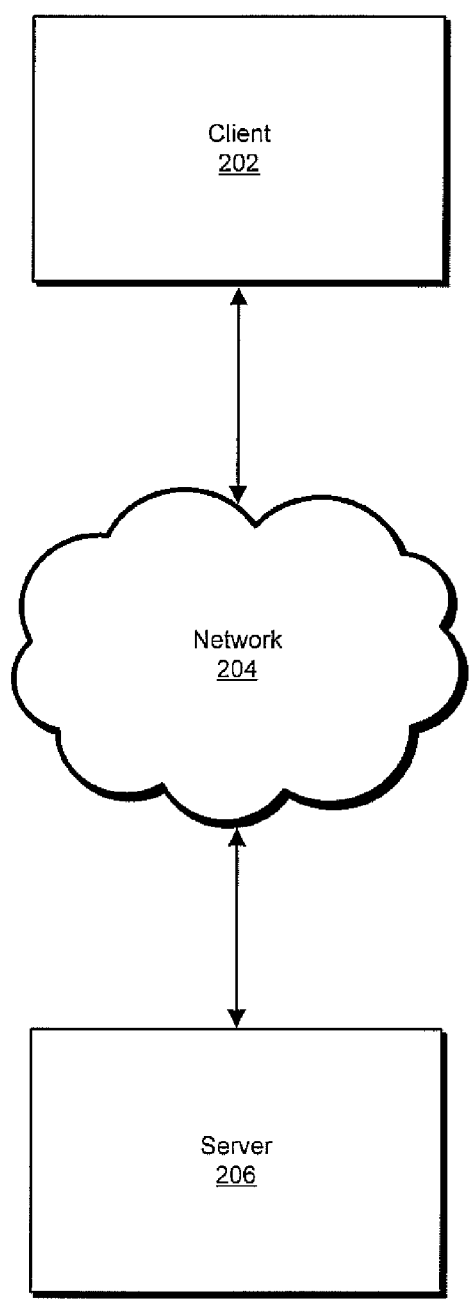
FIG. 2 is a block diagram of an exemplary network-based system for determining the trustworthiness of a server according to at least one embodiment.

Exemplary system 100 in FIG. 1 may be deployed in a variety of ways. In one example, exemplary system 100 may be deployed within a network-based system. FIG. 2 is a block diagram of an exemplary network-based system 200 for determining the trustworthiness of a streaming server. As illustrated in this figure, exemplary system 200 may comprise a client 202 in communication with a server 206 via a network 204.

Client 202 in FIG. 2 generally represents any type or form of client-side computing device capable of executing computer-readable instructions. In certain embodiments, client 202 may comprise one or more portions of exemplary system 100 in FIG. 1. For example, one or more of modules 102 may be stored and configured to run on client 202 in FIG. 2. Similarly, one or more of databases 120 in FIG. 1 may represent portions of client 202 in FIG. 2.

In at least one embodiment, client 202 in FIG. 2 may communicate with server 206 via network 204. Network 204 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 206. Server 206 generally represents any type or form of server-side computing device, such as a streaming server capable of streaming applications or data to clients. In certain embodiments, server 206 may comprise one or more portions of exemplary system 100 in FIG. 1. For example, one or more of modules 102 from FIG. 1 may be stored and configured to run on server 206 in FIG. 2. Similarly, server 206 may comprise one or more of databases 120 in FIG. 1.

Figure 3:
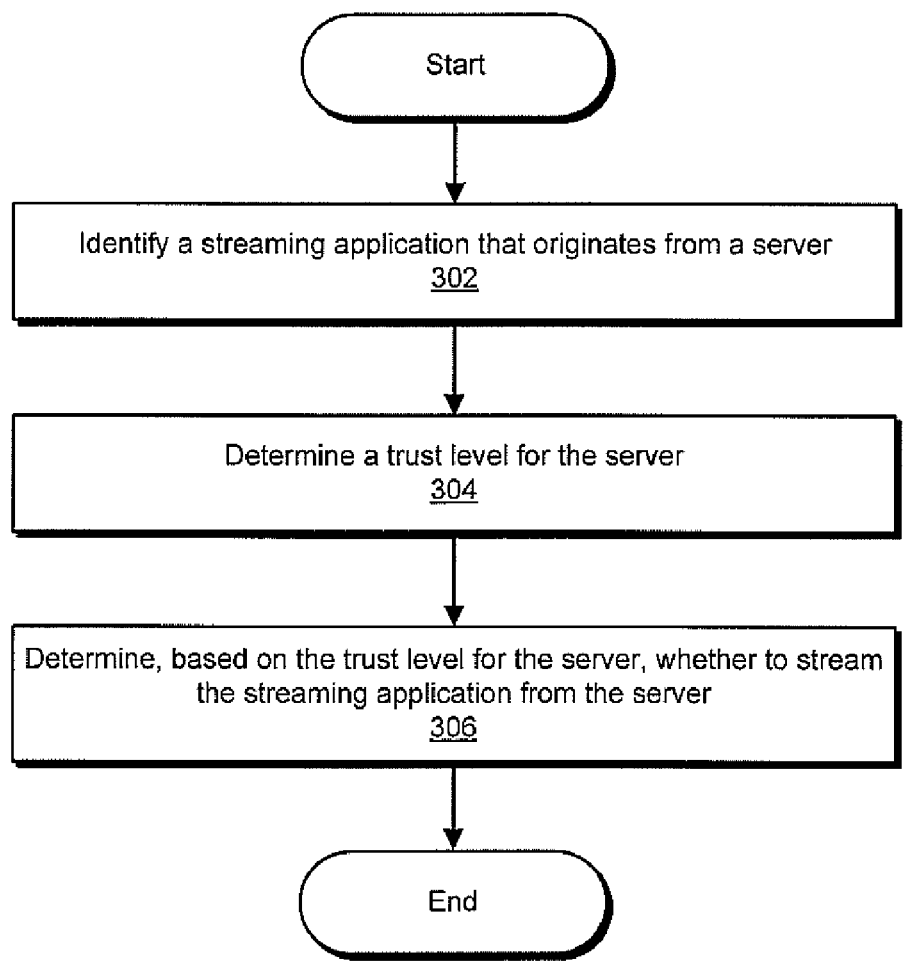
FIG. 3 is a flow diagram of an exemplary computer-implemented method for determining the trustworthiness of a server according to at least one embodiment.

FIG. 3 is a flow diagram of an exemplary computer-implemented method 300 for determining the trustworthiness of a server in a streaming environment. As illustrated in this figure, at step 302 a streaming application that originates from a server may be identified. The phrase "streaming application," as used herein, generally refers to any data or application streamed from a server to a client.

Step 302 may be performed in a variety of ways. In one example, client 202 in FIG. 2 may identify the streaming application either before or after it is downloaded and saved to a local storage device. In another embodiment, client 202 may identify the streaming application when information associated with the streaming application is received from server 206. In a further embodiment, client 202 may identify applications that may be streamed from server 206 at the time client 202 commences communication with server 206.

Returning to FIG. 3, at step 304 a trust level for the server may be determined. For example, server-trust module 110 in FIG. 1 stored on client 202 in FIG. 2 may determine a trust level for server 206 before allowing client 202 to download or execute the streaming application identified in step 302 from server 206. The phrase "trust level," as used herein, generally refers to any information or data that may indicate (or may be used to indicate) the trustworthiness of a server. A trust level for a server may be determined in a variety of ways. For example, as will be explained in greater detail below in connection with FIGS. 4-9, a computing system may determine a trust level for a server by comparing current streams (or portions of current streams) received from the server with prior streams to detect change, by communicating with peer computing systems or reputation services, and/or by analyzing locally stored information In certain examples, a trust level for a server may be represented using numbers. For example, server-trust module 110 may indicate a trust level for a server using a scale from one (1) to ten (10), where zero (0) indicates an untrusted server (such as a server known to host malicious software) and (10) represents a fully-trusted server.

A trust level for a server may indicate that the server offers applications that are completely trusted, offers unstable applications, offers malicious applications, or gradients of the same. For example, a trust level of 10 may indicate that a server is known to offer stable and trusted applications. However, a trust level of 0 may indicate that a server is known to host malware designed to intentionally harm a computing system. Similarly, a trust level of 5 may indicate that a server offers unstable applications that may unintentionally damage a computing system.

At step 306, the system may determine whether to stream the streaming application from the server based on the trust level for the server. For example, server-trust module 110 in FIG. 1 may determine whether to allow client 202 in FIG. 2 to stream the streaming application identified in step 302 from server 206 based on a trust level for server 206. Upon completion of step 306, exemplary method 300 may terminate.

As detailed above, a computing system may determine a trust level for a server in step 304 in a variety of ways. In one example, server-trust module 110 in FIG. 1 on client 202 in FIG. 2 may determine a trust level for server 206 by analyzing data stored in a local history file. The phrase "local history file," as used herein, generally refers to any locally stored information that a client may use to determine the trustworthiness of a server. In certain examples, a local history file may contain information gathered by a client through prior interactions with servers, streaming applications, additional clients, and/or reputation services.

FIG. 6 provides an illustration of an exemplary local history file 600. As illustrated in FIG. 6, local history file 600 may contain previously calculated trust levels for servers (calculated either by client 202, by one or more peer computing devices, or by a reputation service, as explained below), names and digital signatures for servers, IP addresses for servers, names and checksums for previous downloads or streams, and/or trust levels for applications. Local history file 600 may also contain partial checksums for previous downloads or streams (as explained in greater detail below), a time stamp for previous downloads or streams, and any other information that may be useful in determining a trust level. As detailed above, the information contained within local history file 600 may be gathered or calculated by client 202 based on prior interactions with servers, streaming applications, additional clients (such as peer computing devices 401 in FIG. 4, as explained in greater detail below), and/or reputation services (such as reputation service 508 in FIG. 5, as explained in greater detail below).

In certain embodiments, server-trust module 110 in FIG. 1 may use the information contained in local history file 600 in FIG. 6 to determine a trust level for server 206 in FIG. 2. For example, server-trust module 110 may, upon identifying a streaming application that originates from server 206 in step 302, determine whether local history file 600 contains an entry that indicates that client 202: 1) has previously streamed the streaming application in question from server 206, 2) has previously streamed the streaming application in question from other servers, or 3) has previously streamed other applications or data from server 206.

If server-trust module 110 determines, by analyzing local file history 600, that client 202 has previously streamed the streaming application identified in step 302 from server 206, then server-trust module 110 may allow client 202 to stream at least a portion of the streaming application from server 206 if the trust level for both server 206 and the streaming application that originates from server 206 are sufficiently high. For example, server-trust module 110 in FIG. 1 may allow client 202 to stream the application "ubank" from the server "Safety Bank" since the previously calculated trust level for the server "Safety Bank" is 9.8 and the previously calculated trust level for the application "ubank" is 10.

If server-trust module 110 in FIG. 1 determines that client 202 in FIG. 2 has previously streamed the streaming application identified in step 302 from another server (i.e., a server that is different from server 206), then server-trust module 110 may allow client 202 to stream at least a portion of the streaming application from server 206 if the trust level for the previously streamed application is sufficiently high. For example, server-trust module 110 in FIG. 1 may allow client 202 to stream the application "ubank" from a new server "Bank USA" since the previously calculated trust level for the application "ubank" is 10.

Similarly, if server-trust module 110 in FIG. 1 determines that client 202 in FIG. 2 has previously streamed other applications or data from server 206 (i.e., applications or data that are different from the streaming application identified in step 302), then server-trust module 110 may allow client 202 to stream at least a portion of the streaming application from server 206 if the trust level for server 206 is sufficiently high. For example, server-trust module 110 in FIG. 1 may allow client 202 to stream a new application "ubankv6" from the server "Safety Bank" since the previously calculated trust level for the server "Safety Bank" is 9.8.

As detailed above, server-trust module 110 in FIG. 1 may use the information contained in local history file 600 in FIG. 6 to determine a trust level for server 206 in FIG. 2. However, if server-trust module 110 determines, upon analyzing local file history 600, that client 202: 1) has not previously streamed the streaming application in question from server 206, 2) has not previously streamed the streaming application in question from other servers, and 3) has not previously streamed other applications or data from server 206, then server-trust module 110 may attempt to obtain information that may be used to determine the trustworthiness of server 206 from additional sources, such as a peer computing device and/or a reputation service.

Figure 4:
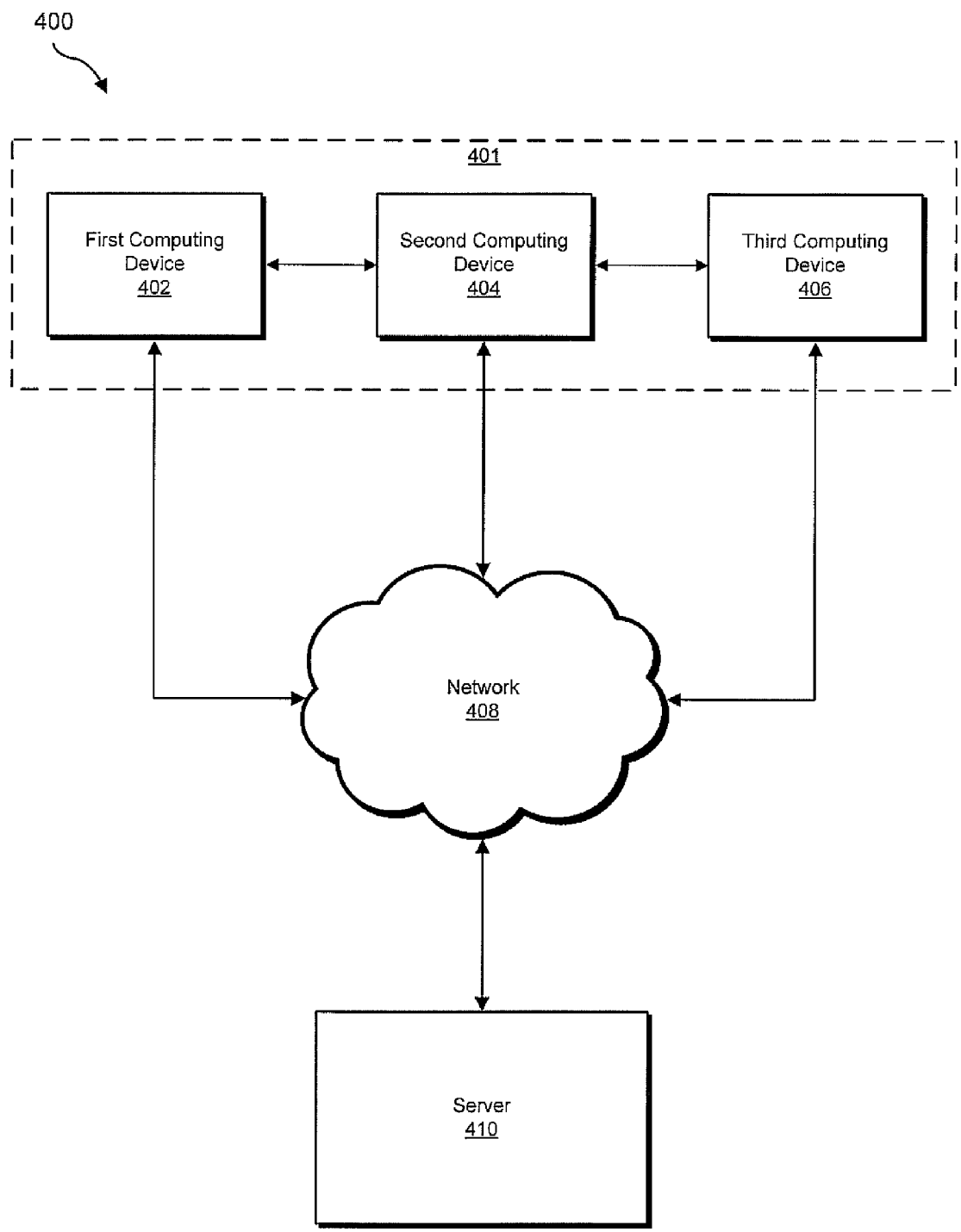
FIG. 4 is a block diagram of an exemplary network-based system for determining the trustworthiness of a server according to at least one embodiment.

FIG. 4 is a block diagram of an exemplary system 400 comprising a plurality of interconnected peer computing devices 401. As illustrated in FIG. 4, peer computing devices 401 may comprise a first computing device 402, a second computing device 404, and a third computing device 406. Peer computing devices 401 may be interconnected in a variety of ways, including through a direct network connection, via the Internet, or through any other means for transmitting information. In one embodiment, peer computing devices 401 may be connected to a server 410 via a network 408.

In one embodiment, first computing device 402 may represent a local file server while second computing device 404 and third computing device 406 may represent computing devices in a LAN. In another embodiment, peer computing devices 401 in FIG. 4 may represent several computers connected together in a peer group. In either example, peer computing devices 401 may share information with one another about the trustworthiness of at least one server, such as server 410. In some examples, network-communication module 104 in FIG. 1 stored on one or more of peer computing devices 401 may communicate information about server 410 with similar interconnected computing devices over network 408.

In certain embodiments, peer computing devices 401 in FIG. 4 may comprise devices dedicated to performing a particular function for determining the trustworthiness of a server. For example, first computing device 402 may comprise a network connection for streaming applications from server 410 over network 408. In addition, second computing device 404 may analyze information received through first computing device 402 from server 410, while third computing device 406 may store both information received from server 410 and the results of the analysis performed by second computing device 404.

Server-trust module 110 may attempt to obtain trust information that may be used to determine the trustworthiness of a server from a peer computing device in a variety of ways. In one example, first computing device 402 may transmit a name, a digital signature, or other identifier for server 410 to second computing device 404 and/or third computing device 406. In another embodiment, first computing device 402 may transmit a name (such as a file name or application name), a digital signature, or other unique identifier (such as a globally unique identifier (GUID)) for a streaming application offered by server 410 to second computing device 404 and/or third computing device 406.

In response, second computing device 404 and/or third computing device 406 may transmit information to first computing device 402 that may be used to determine a trust level for server 410. For example, second computing device 404 and/or third computing device 406 may transmit a server-trust report to first computing device 402. The phrase "server-trust report," as used herein, generally refers to information that is received from another computing device that aids a computing device in determining a trust level for a server.

FIG. 7 is a block diagram of an exemplary server-trust report 700. As illustrated in this figure, server-trust report 700 may contain previously calculated trust levels for servers, names and digital signatures for servers, IP addresses for servers, names and checksums for applications or streams, and/or trust levels for applications. Server-trust report 700 may also contain partial checksums for downloads or streams (as explained in greater detail below), a time stamp for previous downloads or streams, and any other information that may be useful to determine a trust level. In one embodiment, the information contained within server-trust report 700 may be gathered by one or more of peer computing devices 401 through prior interactions with servers, streaming applications, additional clients (such as peer computing devices 401 in FIG. 4), and/or reputation services (such as reputation service 508 in FIG. 5, as explained in greater detail below).

In certain embodiments, server-trust module 110 in FIG. 1 may use the information contained in server-trust report 700 in FIG. 7 to determine a trust level for server 410 in FIG. 4. For example, server-trust module 110 may, upon identifying a streaming application that originates from server 410 in step 302 in FIG. 3, determine whether server-trust report 700 contains an entry that indicates whether any of the devices within peer computing devices 401 in FIG. 4: 1) has previously streamed the streaming application in question from server 410, 2) has previously streamed the streaming application in question from other servers, or 3) has previously streamed other applications or data from server 410.

If server-trust module 110 determines, by analyzing server-trust report 700, that one or more of peer computing devices 401 has previously streamed the streaming application in question from server 410, then server-trust module 110 may allow first computing device 402 to stream at least a portion of the streaming application from server 410 if the trust level for both server 410 and the streaming application that originates from server 410 are sufficiently high. For example, server-trust module 110 in FIG. 1 may allow first computing device 410 to stream the application "ubank" from the server "Safety Bank" since the previously calculated trust level for the server "Safety Bank" is 9.8 and the previously calculated trust level for the application "ubank" is 10.

If server-trust module 110 in FIG. 1 determines that one or more of peer computing devices 401 in FIG. 4 has previously streamed the streaming application identified in step 302 from another server (i.e., a server that is different from server 410), then server-trust module 110 may allow first computing device 402 to stream at least a portion of the streaming application in question from server 410 if the trust level for the previously streamed application is sufficiently high. For example, server-trust module 110 in FIG. 1 may allow first computing device 402 to stream the application "ubank" from a new server "Bank USA" since the previously calculated trust level for the application "ubank" is 10.

Similarly, if server-trust module 110 in FIG. 1 determines that one or more of peer computing devices 401 in FIG. 4 has previously streamed other applications or data from server 410 (i.e., applications or data that are different from the streaming application in question), then server-trust module 110 may allow first computing device 402 to stream at least a portion of the streaming application in question from server 410 if the trust level for server 410 is sufficiently high. For example, server-trust module 110 in FIG. 1 may allow first computing device 402 to stream a new application "ubankv6" from the server "Safety Bank" since the previously calculated trust level for the server "Safety Bank" is 9.8.

In one embodiment, server-trust module 110 in FIG. 1 may rely on a trust level for a server contained in server-trust report 700 in FIG. 7. In an additional example, server-trust module 110 may calculate a trust level for a server based solely on information contained in server-trust report 700. In another example, server-trust module 110 may calculate a trust level for a server based on information contained in server-trust report 700 combined with information contained in local-history file 600.

Figure 5:
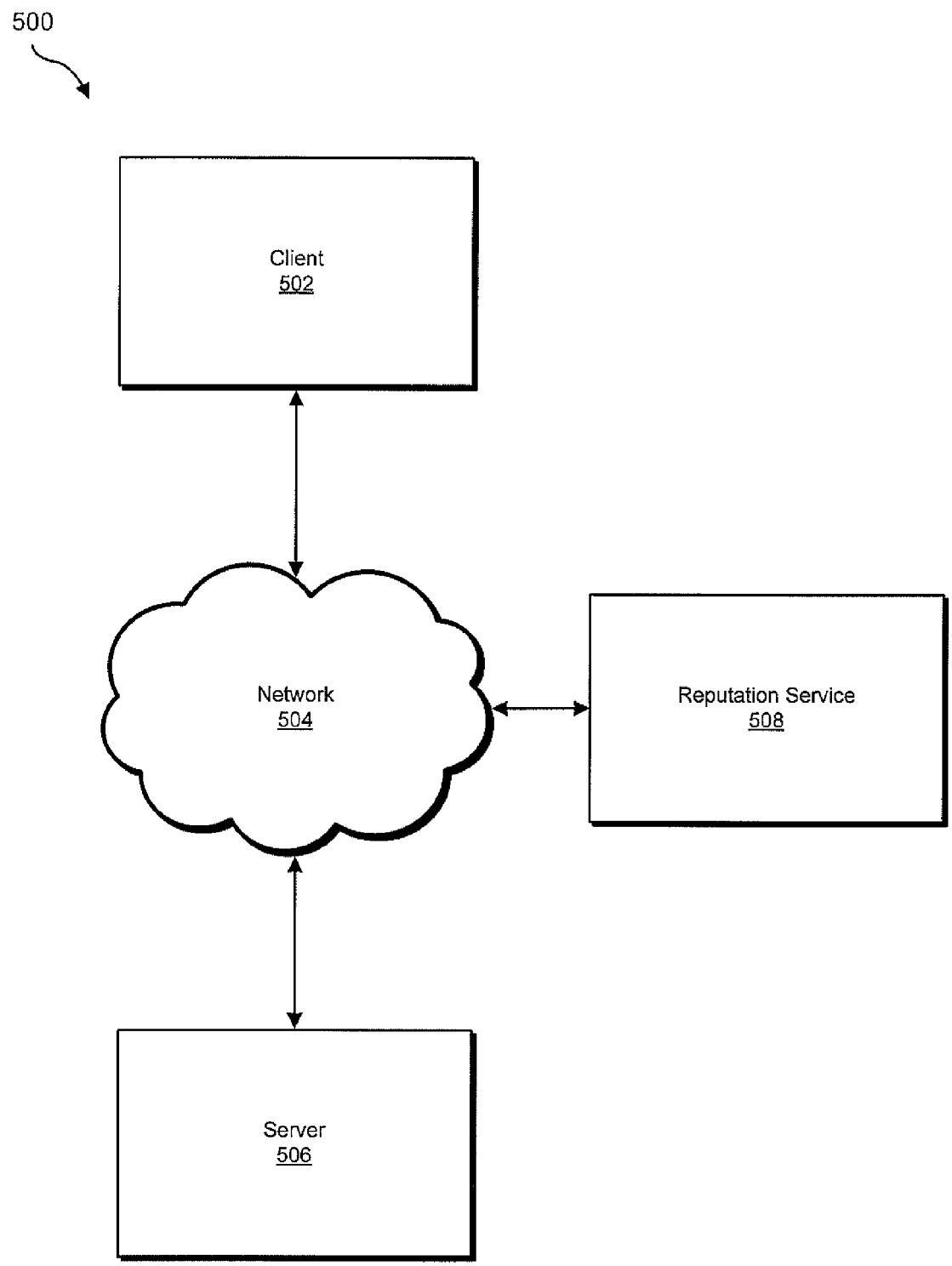
FIG. 5 is a block diagram of an exemplary network-based system for determining the trustworthiness of a server according to at least one embodiment.

As detailed above, server-trust module 110 may also attempt to obtain information that may be used to determine the trustworthiness of a server from a reputation service. FIG. 5 is a block diagram of an exemplary system 500 for obtaining information that may be used to determine the trustworthiness of a server from a reputation service. The term "reputation service," as used herein, generally refers to a server that is external to a computing system that may provide information about the trustworthiness of at least one other server. As illustrated in FIG. 5, exemplary system 500 may comprise a client 502 connected to both a server 506 and a reputation service 508 via a network 504.

In one example, client 502 may attempt to stream an application from server 506. Before server 506 streams the application to client 502, client 502 may transmit a request for information about server 506 and/or the application to be streamed from server 506 to reputation service 508. Reputation service 508 may respond by transmitting information about the application and/or about server 506 (such as server-trust report 700 in FIG. 7) to client 502. Client 502 may use this information to determine a trust level for server 506.

In another embodiment, client 502 in FIG. 5 may represent a plurality of computing devices, such as peer computing devices 401 in FIG. 4. Similarly, reputation service 508 may represent a plurality of computing devices dedicated to providing information regarding the trustworthiness of servers.

In one embodiment, client 502 in FIG. 5 may determine a trust level for server 506 based solely on information received from reputation service 508. In another embodiment, client 502 in FIG. 5 may determine a trust level for server 506 based on the information received from reputation service 508 in combination with other information, such as information received from peer computing devices or stored in a local history file.

Figure 9:
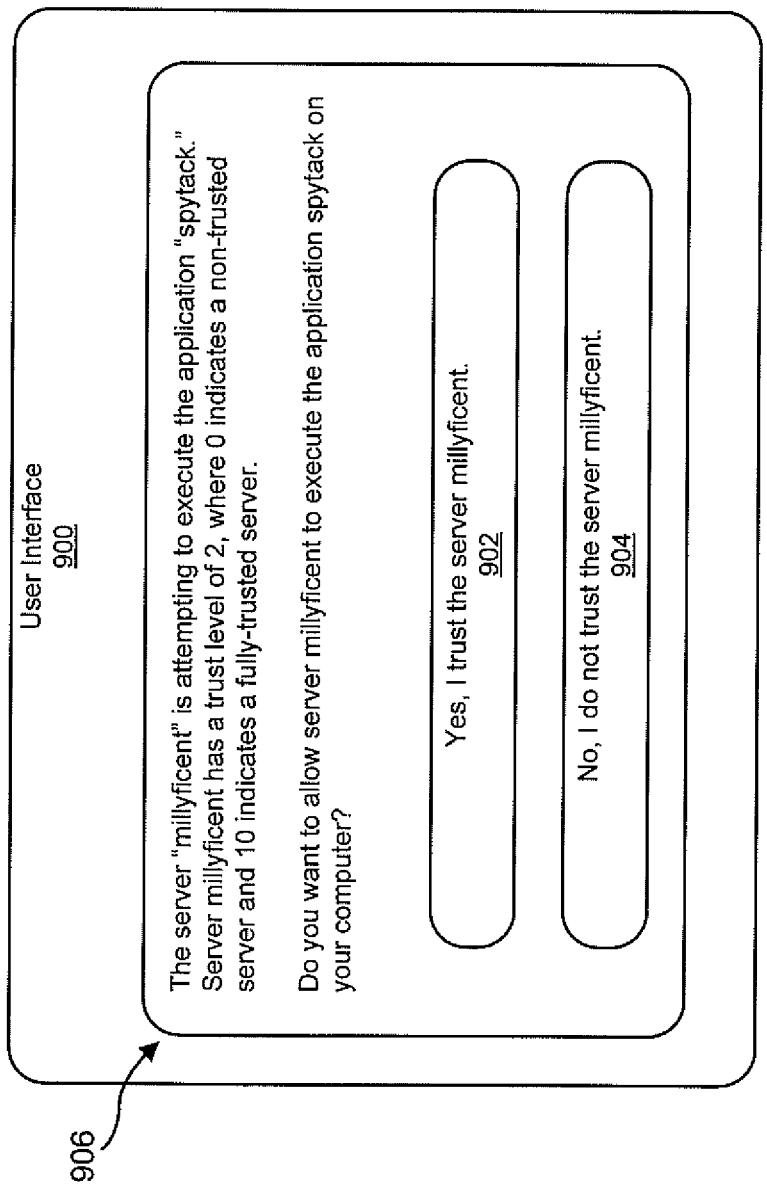
FIG. 9 is a block diagram of an exemplary user interface for prompting a user to determine whether to trust a server according to at least one embodiment.

Returning to step 306 in FIG. 3, in certain embodiments the system may determine whether to stream the application from the server based at least in part on input from a user. For example, server-trust module 110 in FIG. 1 may cause user-interface module 112 to provide a user interface for prompting a user to determine whether to allow client 202 to stream an application from server 206. FIG. 9 is a block diagram of an exemplary user interface 900 for prompting a user to determine whether to allow a client to stream an application from a server. As illustrated in this figure, user interface 900 may comprise an explanatory textbox 906 and a plurality of user-selectable objects 902 and 904.

In one embodiment, explanatory textbox 906 in FIG. 9 may display information about a server or a streaming application offered by the server that may aid a user in determining whether to trust the server. For example, explanatory textbox 906 may display the server's name, the name of the streaming application offered by the server, a trust level for the streaming application, a trust level for the server, and any other information that may aid the user in determining the trustworthiness of the server. If, after reviewing the information provided in explanatory textbox 906, a user determines to allow the client to stream the application from the sever, then the user may select user-selectable object 902. Alternatively, if the user determines that the server is not trustworthy, then the user may select user-selectable object 904.

Returning to step 306 in FIG. 3, if server-trust module 110 in FIG. 1 determines that a trust level for server 206 is sufficiently high (using one or more of the systems or methods described herein), then server-trust module 110 may allow client 202 to stream the streaming application identified in step 302 from server 206. In certain embodiments, client 202 may stream the application by saving the application to a local storage device. In an additional embodiment, client 202 may stream the application by directly executing the application from the server.

In one embodiment, if server-trust module 110 in FIG. 1 determines that client 202 has previously streamed the streaming application identified in step 302 from server 206, then server-trust module 110 may attempt to verify the legitimacy of the data received from server 206 prior to allowing client 202 to stream the entire application from server 206. However, if server-trust module 110 determines that client 202 has not previously streamed the streaming application identified in step 302 from server 206, then server-trust module 110 may allow client 202 to stream the entire application from server 206.

In one example, server-trust module 110 may verify the legitimacy of the data streamed from a server by streaming a first portion of an application from the server and then analyzing the first portion of the application. For example, server-trust module 110 in FIG. 1 may verify the legitimacy of data streamed from server 206 in FIG. 2 by allowing client 202 to stream a first portion of an application from server 206 and then analyzing the same. In certain embodiments, server-trust module 110 may only stream a first portion of an application from server 206 if server-trust module 110 determines, by analyzing a local history file for client 202, that client 202 has previously streamed the application in question from server 206.

In one example, server-trust module 110 may analyze the first portion of the application by: 1) calculating a checksum for the first portion and then 2) determining whether the checksum for the first portion is identical to an expected checksum for the first portion. In certain embodiments, stream-segment module 106 in FIG. 1 may segment the first portion of the application into at least one segment.

FIG. 8 is a block diagram of an exemplary partial checksum verification table 800 that may be created and used to verify the legitimacy of data streamed from a server. As illustrated in this figure, partial checksum verification table 800 may identify a plurality of segments for an application in column 802, expected checksums for each segment in column 804, and calculated checksums for each segment in column 806.

In the example illustrated in FIG. 8, partial checksum verification table 800 may identify a plurality of segments of equal size. For example, each segment identified in column 802 may contain a data block of size 0xFFFF bytes. In another embodiment, stream-segment module 106 in FIG. 1 may segment a streaming application into segments according to functionality. For example, a streaming application may contain a package of code dedicated to word processing, and another package of code dedicated to calculating. In this example, stream-segment module 106 may segment the streamed application into a word-processing segment and a calculating segment.

In a further embodiment, stream-segment module 106 in FIG. 1 may segment the streaming application at predetermined segment points that indicate where to segment the streamed application. For example, a streaming application may contain indicators in its data stream that indicate the start and end of particular data segments. In this example, stream-segment module 106 may segment the streaming application at each indication. In another embodiment, stream-segment module 106 may consider an entire application a segment.

In the example illustrated in FIG. 8, calculated checksum table 806 contains calculated checksums for each segment listed in segment description table 802.

In one embodiment, server-trust module 110 may verify the legitimacy of data streamed from a server by comparing the calculated checksum for a segment with a previously calculated checksum for the segment. For example, for the segment containing bytes 0-FFFF, server-trust module 110 may compare a calculated checksum for the segment (61471177) with an expected checksum for the segment (61471177). Since the checksums are identical, server-trust module 110 in FIG. 1 may allow client 202 in FIG. 2 to stream at least one additional portion of the application from server 206.

Similarly, for the segment containing bytes 200000-20FFFF, server-trust module 110 may compare a calculated checksum for the segment (52626564) with an expected checksum for the segment (14041469). Since these checksums differ, server-trust module 110 in FIG. 1 may prevent client 202 in FIG. 2 from streaming any additional portions of the application from server 206 since the differing checksums may indicate that the security of the server has been compromised.

As detailed above, if server-trust module 110 determines that client 202 has not previously streamed the streaming application identified in step 302 from server 206, then server-trust module 110 may allow client 202 to stream the entire application from server 206. In this example, upon streaming the entire application from server 206, the system may calculate a checksum for the entire application and then compare the same with an expected checksum for the entire application.

In an additional example, client 202 may, prior to streaming an application from server 206, receive a certificate or digital signature for the application from server 206 that attests to the identity of the application. The phrases "certificate" or "digital signature," as used herein, generally refer to any means, such as a checksum or hash, for uniquely identifying an application or at least one component of an application (such as a single binary). In this example, server-trust module 110 may, upon allowing client 202 to stream an entire application from server 206 (or at least one entire component of the application), verify whether client 202 actually received the application identified in the certificate provided by server 206. For example, server-trust module 110 may, upon allowing client 202 to stream at least one entire component of the application from server 206, verify the identity of the application received from server 206 by: 1) retrieving and validating a digital signature for the component (such as from a local file, a peer computing device, or a reputation service), and then 2) verifying the legitimacy of the certificate by comparing the digital signature received from the server with the retrieved digital signature.

In certain embodiments, the results of any analysis or calculation performed on a streamed application may be stored or transmitted to an additional device. For example, server-trust module 110 in FIG. 1 stored on client 202 in FIG. 2 may store the results of a checksum analysis for a streamed application in local history file 600. Similarly, server-trust module 110 may, upon verifying whether client 202 actually received the application identified in a certificate provided by server 206, store the results of such an analysis in local history file 600. In addition, after client 202 prompts the user to determine whether to allow the application to stream from server 206, server-trust module 110 on client 202 may create an entry in local history file 600 that indicates whether the user allowed the application to stream.

In another embodiment, server-trust module 110 in FIG. 1 on first computing device 402 in FIG. 4 may transmit the results of a checksum analysis, the results of a certificate check, the results of a user's decision, the contents of a local history file, and any other information that may be useful for future determinations of a trust level for server 410 to second computing device 404 and/or third computing device 406.

In a further embodiment, server-trust module 110 in FIG. 1 on client 502 in FIG. 5 may transmit the results of a checksum analysis, the results of a certificate check, the results of a user's decision, the contents of a local history file, and any other information that may be useful for future determinations of a trust level for server 506 to reputation service 508. Reputation service 508 may then update any stored information to accurately reflect the trustworthiness of server 506. Reputation service 508 may also make the results of the analysis available to other computing devices.

The systems and methods disclosed herein may enable a client computing system to determine and continually monitor the trustworthiness of a server. Since prior trust information about a server is not required, these systems and methods may be deployed within networks (such as networks involving consumers) in which a relationship of trust between a server and a client may not have previously existed.

Figure 10:
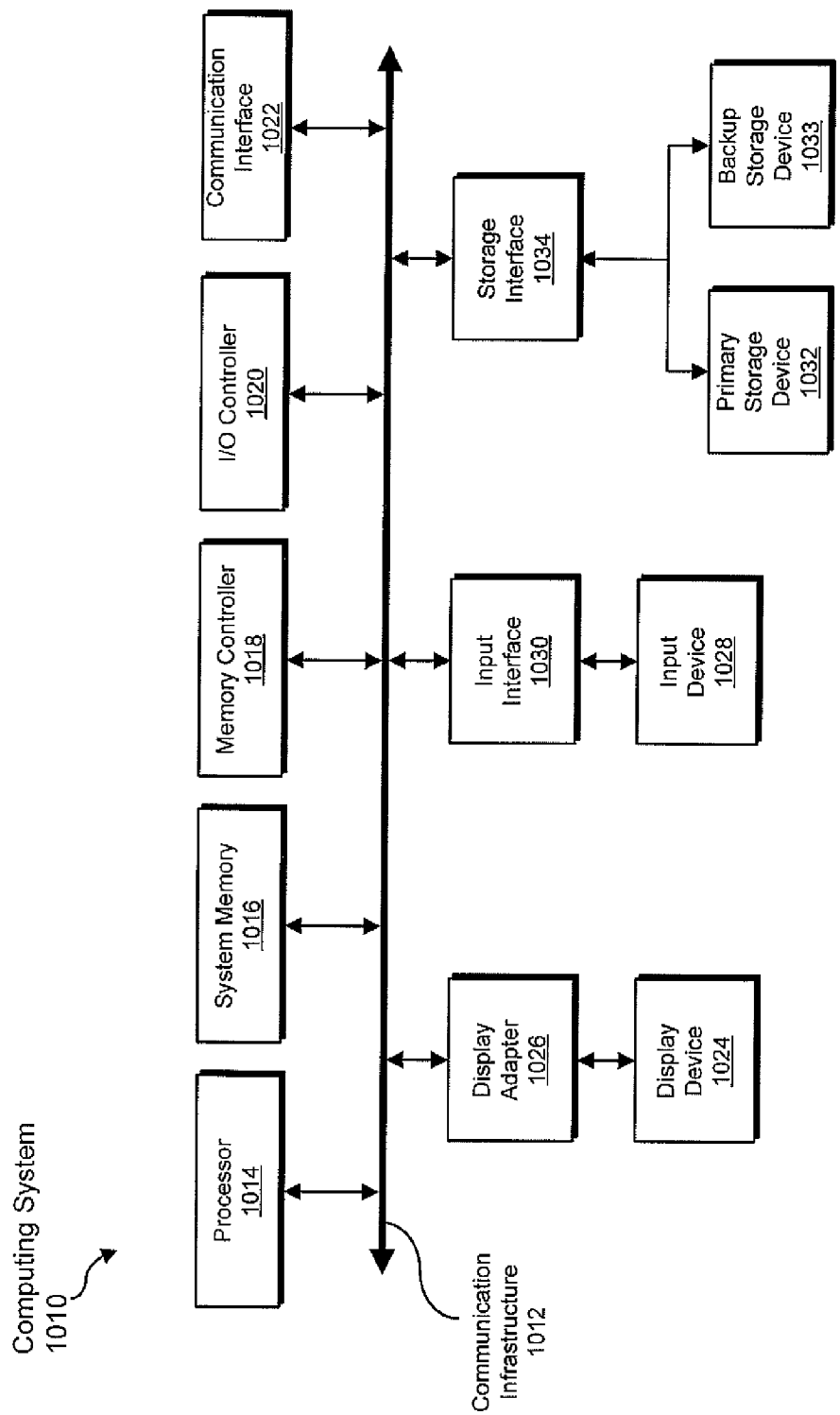
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the identifying, determining, streaming, analyzing, calculating, obtaining, storing, transmitting, segmenting, verifying, validating, retrieving, and prompting steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 10, computing system 1010 may comprise a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as identifying, determining, streaming, analyzing, calculating, verifying, obtaining, storing, transmitting, segmenting, validating, retrieving, and prompting.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the identifying, verifying, determining, streaming, analyzing, calculating, obtaining, storing, transmitting, validating, retrieving, segmenting, and prompting steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1094 host adapters, SATA and eSATA host adapters, ATA and DATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the identifying, determining, streaming, analyzing, calculating, obtaining, storing, transmitting, segmenting, verifying, validating, retrieving, and prompting steps disclosed herein. Communication interface 1022 may also be used to perform and/or be a means for performing other steps and features set forth in the instant disclosure.

As illustrated in FIG. 10, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the identifying, determining, streaming, analyzing, calculating, obtaining, storing, transmitting, segmenting, verifying, validating, retrieving, and prompting steps disclosed herein. Input device 1028 may also be used to perform and/or be a means for performing other steps and features set forth in the instant disclosure.

As illustrated in FIG. 10, exemplary computing system 1010 may also comprise a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the identifying, determining, streaming, analyzing, calculating, obtaining, storing, transmitting, segmenting, verifying, validating, retrieving, and prompting steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments described and/or illustrated herein.

The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
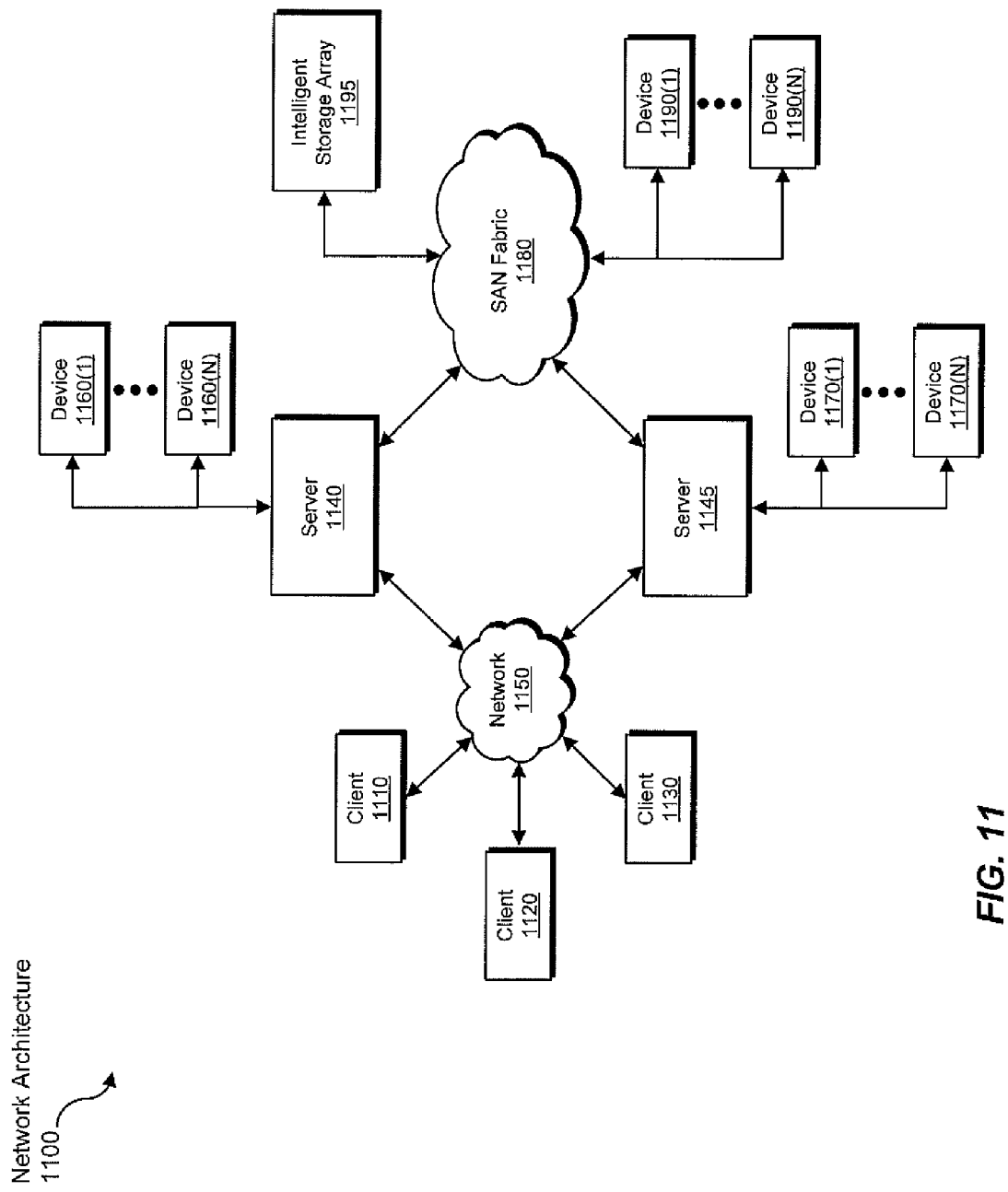
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the identifying, determining, streaming, analyzing, calculating, obtaining, storing, transmitting, segmenting, verifying, validating, retrieving, and prompting steps disclosed herein. Network architecture 1100 may also be used to perform and/or be a means for performing other steps and features set forth in the instant disclosure.

As detailed above, computing system 1010 and/or one or more of the components of network architecture 1100 may perform and/or be a means for performing, either alone or in combination with other elements, one or more steps of the exemplary methods described and/or illustrated herein. For example, a computer-implemented method for determining the trustworthiness of a server may comprise: 1) identifying a streaming application that originates from a server, 2) determining a trust level for the server, and 3) determining, based on the trust level, whether to stream the streaming application from the server.

Determining the trust level for the server may comprise streaming a first portion of the streaming application from the server and analyzing the first portion of the streaming application. Analyzing the first portion of the streaming application may comprise calculating a checksum for the first portion and determining whether the checksum for the first portion is identical to an expected checksum for the first portion.

The method may further comprise determining that the checksum for the first portion is identical to the expected checksum for the first portion, streaming at least one additional portion of the streaming application from the server, calculating a checksum for the additional portion, and then determining whether the checksum for the additional portion is identical to an expected checksum for the additional portion.

In addition, the method may further comprise, prior to streaming the first portion of the streaming application, determining, by analyzing a local history file, that the streaming application has previously been streamed from the server. Similarly, The method may further comprise, prior to determining whether the checksum for the first portion is identical to the expected checksum for the first portion, obtaining the expected checksum for the first portion from a local history file, a peer computing device, and/or a reputation service.

The method may also comprise storing results of the analysis in a local history file, transmitting the results to a peer computing device, and/or transmitting the results to a reputation service. In addition, the method may comprise segmenting the first portion of the streaming application into at least one segment based on size, functionality, and/or a predetermined segment point and then analyzing the at least one segment.

Determining the trust level for the server may comprise obtaining information that may be used to determine the trust level for the server from a reputation service and/or a peer computing device. In addition, the method may further comprise, prior to obtaining the trust information for the streaming application, transmitting identification information for the server or the streaming application to the reputation service and/or the peer computing device. The identification information for the streaming application may comprise an application name, a file name, and/or a unique identifier.

The method may further comprise streaming the entire streaming application from the server and/or calculating a checksum for the streaming application. The method may also comprise storing the checksum in a local history file, transmitting the checksum to a peer computing device, and/or transmitting the checksum to a reputation service. In certain embodiments, the checksum may comprise a partial checksum for a portion of the streaming application and/or a full checksum for the streaming application.

The trust level for the server may also be determined by: 1) receiving a certificate for the streaming application from the server, the certificate comprising a digital signature for at least a first component of the streaming application, 2) streaming at least the first component of the streaming application from the server, 3) retrieving and validating a digital signature for the first component, and then 4) verifying the legitimacy of the certificate by comparing the digital signature received from the server with the retrieved digital signature.

In one embodiment, determining the trust level for the server may comprise analyzing a local history file that identifies a previously calculated trust level for the server, trust information for the streaming application, an entry that indicates that the streaming application has previously been successfully streamed from the server, and/or an entry that indicates that the streaming application has previously been successfully streamed from at least one other server. Determining whether to stream the streaming application from the server may also comprise prompting, via a user interface, a user to determine whether to stream the streaming application from the server.

Computing system 1010 and/or one or more of the components of network architecture 1100 may also represent all or a portion of a system for determining the trustworthiness of a server. In this example, the system may comprise an application-stream module for identifying a streaming application that originates from a server, and a server-trust module for determining a trust level for the server and determining, based on the trust level, whether to stream the streaming application from the server. In certain embodiments, the server-trust module may be further configured to stream a first portion of the streaming application from the server, calculate a checksum for the first portion, and/or determine whether the checksum for the first portion is identical to an expected checksum for the first portion.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining server trustworthiness in an application streaming environment, the computer-implemented method being performed by a client computing device comprising at least one processor, the computer-implemented method comprising:

identifying a streaming application that originates from a server;

determining a trust level for the server at least in part by:
 receiving, from a remote computing device, information to be used in identifying the trust level for the server; and
 using the information received from the remote computing device to identify a numeric score that represents the trust level for the server;

determining that the numeric score that represents the trust level for the server satisfies a predetermined threshold;

in response to the determination that the numeric score satisfies the predetermined threshold, streaming at least a portion of the streaming application from the server;

verifying whether the portion of the streaming application that was streamed from the server is legitimate by:
 calculating a checksum for the portion of the streaming application that was streamed from the server;
 determining, by comparing the checksum with an expected checksum, whether the checksum matches the expected checksum;

determining, based on whether the portion of the streaming application that was streamed from the server is legitimate, whether to continue streaming the streaming application from the server.

2. The computer-implemented method of claim 1, wherein streaming at least the portion of the streaming application comprises:
 streaming less than all of the streaming application from the server;
 streaming the entire streaming application from the server.

3. The computer-implemented method of claim 1, wherein determining whether to continue streaming the streaming application from the server comprises at least one of:
 determining whether to stream at least one additional portion of the streaming application from the server;
 determining whether to stream at least one portion of at least one additional streaming application from the server.

4. The computer-implemented method of claim 1, further comprising, prior to streaming at least the portion of the streaming application, determining, by analyzing a local history file, that the streaming application has previously been streamed from at least one of:
 the server;
 at least one additional server.

5. The computer-implemented method of claim 1, further comprising obtaining the expected checksum from at least one of:
 a local history file;
 a peer computing device; a reputation service.

6. The computer-implemented method of claim 1, further comprising:
 storing results of the comparison in a local history file;
 transmitting the results to a peer computing device;
 transmitting the results to a reputation service.

7. The computer-implemented method of claim 1, further comprising:
 segmenting the portion of the streaming application into at least one segment based on at least one of:
  size;
  functionality;
  a predetermined segment point;
 analyzing the at least one segment.

8. The computer-implemented method of claim 1, wherein the remote computing device comprises at least one of:
 the server;
 a reputation service;
 a peer computing device.

9. The computer-implemented method of claim 1, further comprising, prior to receiving the information from the remote computing device, transmitting identification information for the server or the streaming application to at least one of:
 the server;
 a reputation service;
 a peer computing device.

10. The computer-implemented method of claim 1, further comprising:
 receiving a certificate for the streaming application from the server, the certificate comprising a digital signature for at least a first component of the streaming application;
 streaming at least the first component of the streaming application from the server;
 retrieving and validating a digital signature for the first component;
 verifying the certificate by comparing the digital signature received from the server with the retrieved digital signature.

11. The computer-implemented method of claim 1, further comprising prompting a user of the client computing device to determine whether to stream the streaming application from the server.

12. The computer-implemented method of claim 1, further comprising at least one of:
 storing the checksum in a local history file;
 transmitting the checksum to a peer computing device;
 transmitting the checksum to a reputation service.

13. The computer-implemented method of claim 1, wherein the checksum comprises at least one of:
 a partial checksum for less than all of the streaming application;
 a full checksum for the entire streaming application.

14. The computer-implemented method of claim 1, wherein determining the trust level for the server further comprises analyzing a local history file, the local history file identifying at least one of:
 a previously calculated trust level for the server;
 trust information for the streaming application;
 an entry that indicates that the streaming application has previously been successfully streamed from the server;
 an entry that indicates that the streaming application has previously been successfully streamed from at least one other server.

15. The computer-implemented method of claim 1, wherein using the information received from the remote computing device to identify the numeric score that represents the trust level for the server comprises at least one of:
 identifying the numeric score that represents the trust level for the server within the information received from the remote computing device;
 using the information received from the remote computing device to calculate the numeric score that represents the trust level for the server.

16. A client system for determining the trustworthiness of a server in an application streaming environment, the system comprising:

at least one hardware processor;
an application-stream module programmed to identify a streaming application that originates from a server;
a server-trust module programmed to:
determine a trust level for the server at least in part by:
   receiving, from a remote computing device, information to be used in identifying the trust level for the server; and
   using the information received from the remote computing device to identify a numeric score that represents the trust level for the server;
determine that the numeric score that represents the trust level for the server satisfies a predetermined threshold;
in response to the determination that the numeric score satisfies the predetermined threshold, stream at least a portion of the streaming application from the server;
verify whether the portion of the streaming application that was streamed from the server is legitimate by:
   calculating a checksum for the portion of the streaming application that was streamed from the server;
   determining, by comparing the checksum with an expected checksum, whether the checksum matches the expected checksum;
determine, based on whether the portion of the streaming application that was streamed from the server is legitimate, whether to continue streaming the streaming application from the server.

17. The client system of claim 16, wherein the server-trust module is further programmed to obtain the expected checksum from at least one of:
a local history file;
a peer computing device;
a reputation service.

18. A non-transitory computer-readable storage medium comprising one or more computer-executable instructions that, when executed by a client computing device, cause the client computing device to:
identify a streaming application that originates from a server;
determine a trust level for the server at least in part by:
   receiving, from a remote computing device, information to be used in identifying the trust level for the server; and
   using the information received from the remote computing device to identify a numeric score that represents the trust level for the server;
determine that the numeric score that represents the trust level for the server satisfies a predetermined threshold;
in response to the determination that the numeric score satisfies the predetermined threshold, stream at least a portion of the streaming application from the server;
verify whether the portion of the streaming application that was streamed from the server is legitimate by:
   calculating a checksum for the portion of the streaming application that was streamed from the server;
   determining, by comparing the checksum with an expected checksum, whether the checksum matches the expected checksum;
determine, based on whether the portion of the streaming application that was streamed from the server is legitimate, whether to continue streaming the streaming application from the server.

19. The non-transitory computer-readable storage medium of claim 18, wherein the one or more computer-executable instructions, when executed by the client computing device, further cause the client computing device to obtain the expected checksum from at least one of:
a local history file;
a peer computing device;
a reputation service.

* * * * *